United States Patent [19]
Omi

[11] Patent Number: 5,841,133
[45] Date of Patent: Nov. 24, 1998

[54] OPTICAL DISPLACEMENT DETECTING APPARATUS HAVING GRATINGS AND A LIGHT RECEIVING CHIP

[75] Inventor: Toshihiro Omi, Kawasaki, Japan

[73] Assignee: Mitutoyo Corporation, Kawasaki, Japan

[21] Appl. No.: 958,154

[22] Filed: Oct. 27, 1997

[30] Foreign Application Priority Data

Oct. 28, 1996 [JP] Japan .................................... 8285541

[51] Int. Cl.⁶ ..................................................... G01D 5/34
[52] U.S. Cl. .............................. 250/231.13; 250/231.18; 250/237 G; 356/373
[58] Field of Search ...................... 250/231.13, 231.18, 250/237 G, 231.16; 356/373

[56] References Cited

U.S. PATENT DOCUMENTS 5,283,434  2/1994  Ishizuka et al. .................... 250/231.16

FOREIGN PATENT DOCUMENTS

| | | |
|---|---|---|
| A-184 628 | 6/1986 | European Pat. Off. . |
| A-564 683 | 10/1993 | European Pat. Off. . |
| A-643 286 | 3/1995 | European Pat. Off. . |
| A-44 02 554 | 10/1994 | Germany . |
| A-60-171418 | 9/1985 | Japan . |
| A-1-136021 | 5/1989 | Japan . |
| 1-405 362 | 9/1975 | United Kingdom . |

*Primary Examiner*—Que Le
*Attorney, Agent, or Firm*—Oliff & Berridge, PLC

[57] ABSTRACT

An optical encoder is disclosed, that comprises a main scale 1, a light radiating means 2, and a second member 3. The main scale 1 is a first member having an optical grating 12. The light radiating means 2 radiates collimated light to the main scale 1. The second member 3 detects variations of bright images and dark images corresponding to the relative movement between the main scale 1 and the second member 3. The second member 3 comprises a glass substrate 4 and a light receiving IC chip 5. The glass substrate 4 has thin film electrodes. The light receiving IC chip 5 has a light receiving device array 51 that is in common with an index grating, is disposed on a reverse surface of the glass substrate through solder bumps 54 by face-down bonding method. A transparent resin for sealing the front surface of the light receiving IC chip is filled in a gap between the IC chip 5 and the glass substrate 4.

9 Claims, 8 Drawing Sheets

LIGHT AXIS

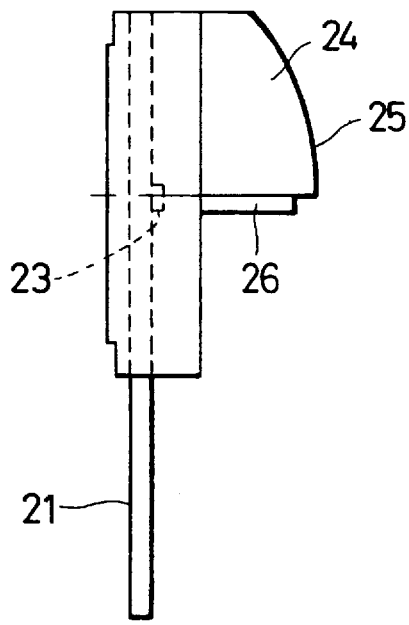
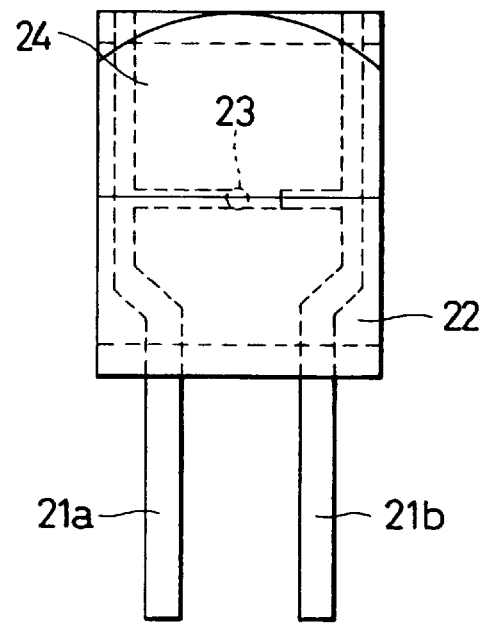
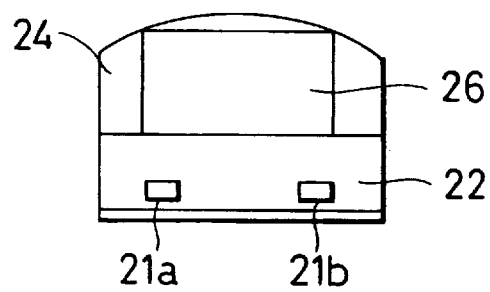

OPTICAL DISPLACEMENT DETECTING APPARATUS HAVING GRATINGS AND A LIGHT RECEIVING CHIP

BACKGROUND OF THE INVENTION

1. Field of the Invention

The present invention relates to an optical displacement detecting apparatus for detecting variations of bright images and dark images caused by mutual movement of a first member and a second member to detect the displacement between the first member and the second member, in particular, to an optical displacement detecting apparatus effective for a small hand-tool length measuring device.

2. Prior Art

A conventional optical encoder used as a linear encoder or a rotary encoder comprises a scale, an index, a light source, and a light receiving means. The scale has an optical grating with predetermined grating pitches. The index has an optical grating with predetermined grating pitches, is disposed opposite to the scale with a predetermined gap. The light source radiates collimated light to the scale. The light receiving means detects variations of bright images and dark images caused by an overlap of the grating members of the scale and the index due to the movement of the scale. The optical encoders have two types that are a transmission type and a reflection type. In the transmission type, a transmitted pattern of the scale is detected. In the reflection type, a reflected pattern of the scale is detected. As an example of the light receiving means, a system having a light receiving device array that is in common with an index is known.

When such an optical encoder is applied to a hand-tool length measuring device, it is necessary to reduce the sizes of the light source portion and the light receiving portion. To decrease the size of the light source portion, the inventor of the present invention has proposed the following technology as Japanese Patent Laid-Open Publication No. 1-136021. In the related art, an LED is molded with a hemispherical transparent resin. A reflection film is formed on the front surface of the resin. Thus, a collimated light source is provided.

As examples of the light receiving portion, several methods are known. (a) A light receiving IC chip is disposed on a wiring board in such a manner that the light receiving surface of the light receiving IC chip faces upward. The light receiving IC chip and the wiring board are connected by the wire bonding method. The resultant structure is molded with a resin. (b) A light receiving IC chip is disposed on a frame (package). Thereafter, the light receiving side is covered with a glass sheet. $N_2$ gas is filled in the package.

However, in the conventional methods, when the apparatus is applied to a small linear gauge with an outer diameter of 8 mm $\phi$, the light receiving portion has many structural problems to solve. Although it is to protect the light receiving IC that as in the method (a) where the entire light receiving IC chip is molded with a resin or as in the method (b) where the light receiving IC chip is sealed with a package, in these structures, it is difficult to precisely decrease the gap between the light receiving surface of the light receiving IC and the scale or the index. In addition, when the gap cannot be decreased due to the presence of the molded resin or glass sheet, it is difficult to precisely align the scale or index with the light receiving IC. To enhance the function of the apparatus, it is necessary to dispose an amplifier, a capacitor, a zero point detection light receiving device, and so forth in the light receiving portion along with the light receiving device. However, these devices prevent the size of the light receiving portion from being decreased. Consequently, it is difficult to quantitatively produce the optical encoders and decrease the production steps thereof, thereby preventing the cost thereof from reducing.

SUMMARY OF THE INVENTION

The present invention is made from the above-described point of view. An object of the present invention is to provide an optical displacement detecting apparatus that allows the gap between structural portions to be precisely adjusted, the size to be decreased, and the function to be enhanced.

The present invention is an optical displacement detecting apparatus, comprising: a first member having a first optical grating; a light radiating device for radiating light to the first optical grating of said first member; and a second member having a second optical grating, disposed opposite to said first member through a gap so that said first member and said second member can be relatively moved, for receiving the light radiated from said light radiating device through the first optical grating and the second optical grating so as to detect the relative displacement between said first member and said second member, wherein said second member has a transparent substrate which has a front surface opposite to the first member with the gap and a reverse surface on which thin film electrodes are disposed, and a light receiving chip which has a light detecting device for receiving the light and solder bumps formed on the light receiving chip corresponding to the thin film electrodes on the reverse surface of the transparent substrate, said light receiving chip being disposed on the reverse surface of the transparent substrate through the solder bumps and the thin film electrodes by face-down bonding method, and wherein the second optical grating is disposed on at least one of the transparent substrate and the light receiving chip.

According to the present invention, the light receiving chip is disposed on the transparent substrate with thin film electrodes through solder bumps by the face-down bonding method. In this structure, at the heat fitting step of the face-down bonding process, the gap and the relative position between the light receiving chip and the transparent substrate can be precisely adjusted. Thus, the gap and positions of the light receiving surface of the light receiving chip and the first member (main scale) or the second member (index scale) can be precisely set up.

In addition, since the light receiving chip and the transparent substrate are connected by the face-down bonding method rather than the wiring bonding method, the size of the transparent substrate can be decreased. In addition, the electrical connections and mechanical connections for the constant gap can be performed at the same time. Thus, an optical displacement detecting device can be produced at low cost.

BRIEF DESCRIPTION OF THE DRAWINGS

The invention is described further, by way of example, with reference to the accompanying drawings in which:

FIG. 5A is a side view showing the structure of a light radiating means according to the embodiment;

FIG. 5B is a top view showing the structure of the light radiating means according to the embodiment;

FIG. 5C is a front view showing the structure of the light radiating means according to the embodiment;

DETAILED DESCRIPTION OF THE PREFERRED EMBODIMENTS

Next, with reference to the accompanying drawings, embodiments of the present invention will be described.

Figure 1:
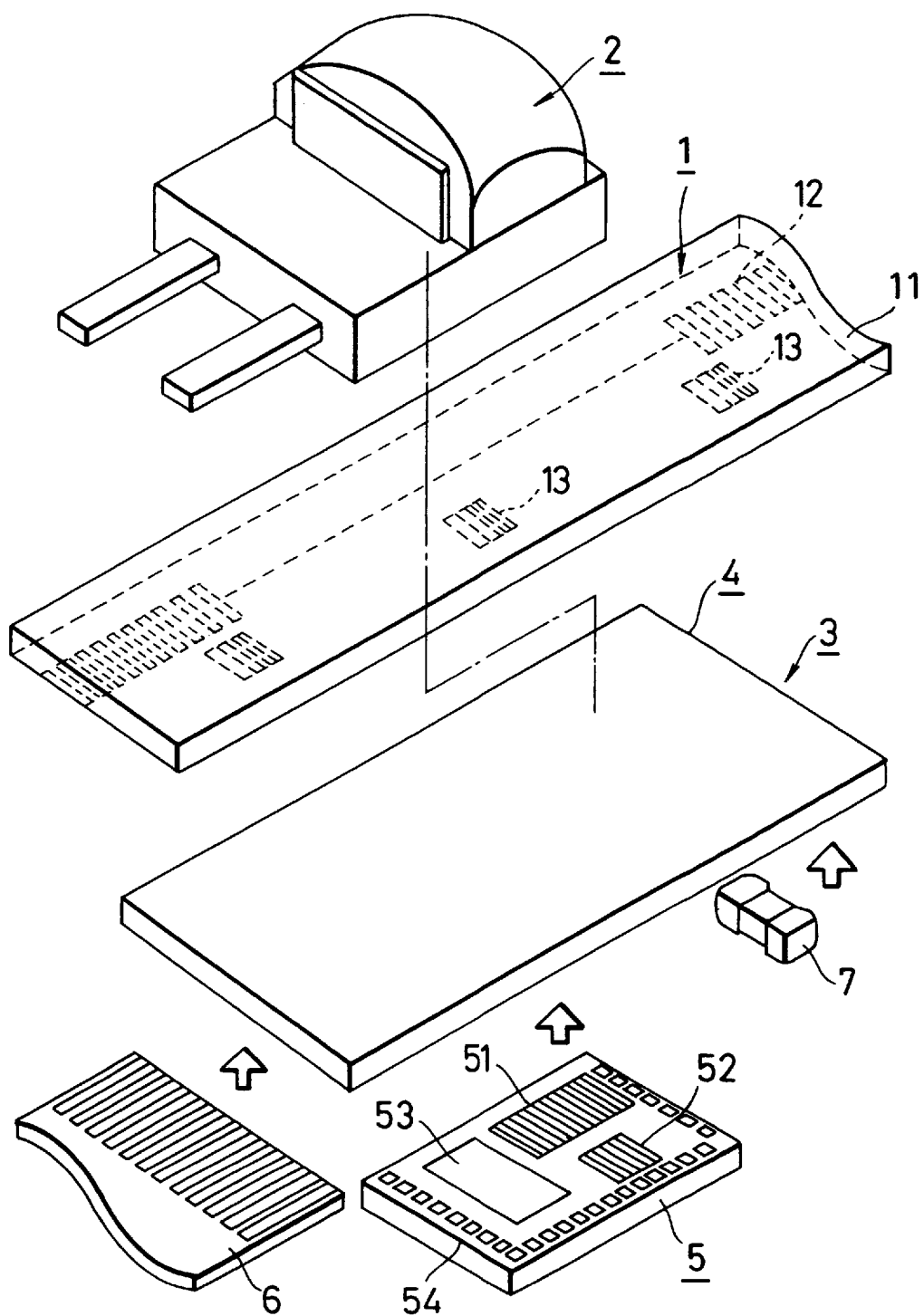
FIG. 1 is an exploded perspective view showing the structure of an optical encoder according to an embodiment of the present invention.

FIG. 1 is an exploded perspective view showing the structure of an optical encoder according to an embodiment of the present invention. The optical encoder according to the embodiment comprises a main scale 1 as a first member, a light radiating device 2, and a second member 3. The light radiating device 2 radiates collimated light to the main scale 1. The second member 3 receives transmitted light of the main scale 1. The light radiating device 2 is composed by molding an LED with a resin. Light emitted by the LED is reflected by a concave surface so as to obtain collimated light. The detail will be described later. The main scale 1 is composed of a glass substrate 11. A pattern with a mask member is formed on a surface of the glass substrate 1 in such a manner that the pattern is opposite to the second member 3. Thus, a first optical grating 12 with predetermined grating pitches is formed on the surface.

Figure 2A:
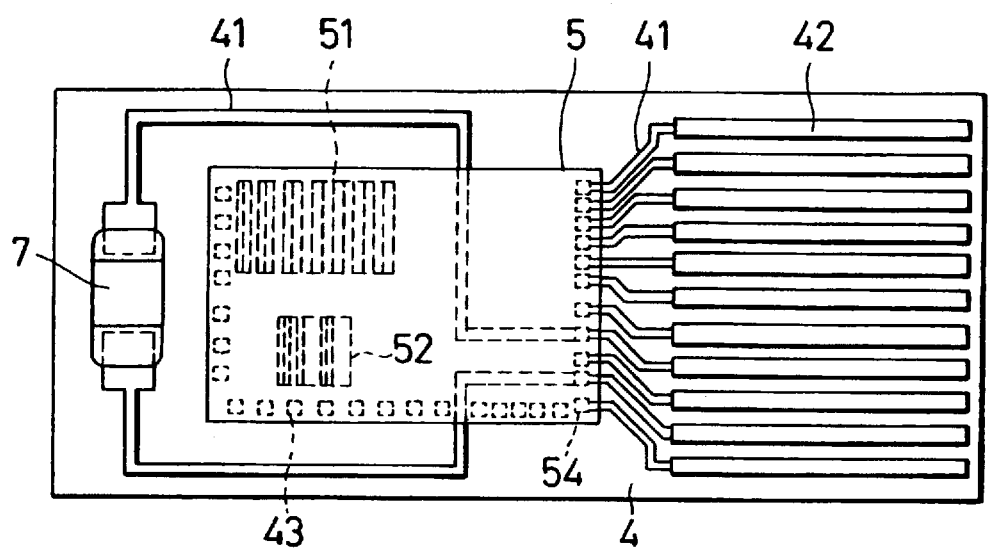
FIG. 2A is a plan view showing the integral structure of a light receiving IC chip and a glass substrate according to the embodiment.
Figure 2B:
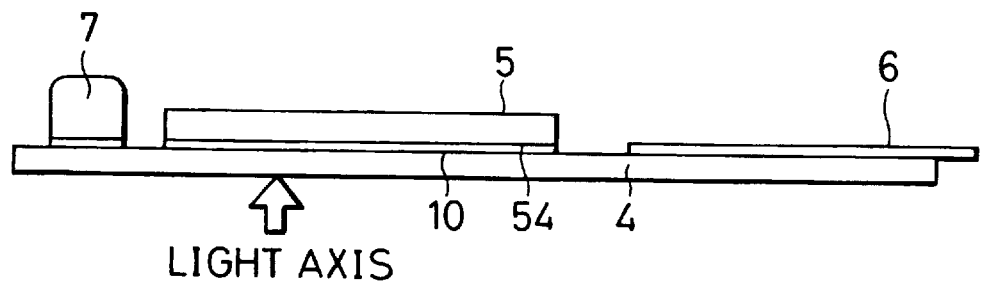
FIG. 2B is a side view of FIG. 2A.
Figure 2C:
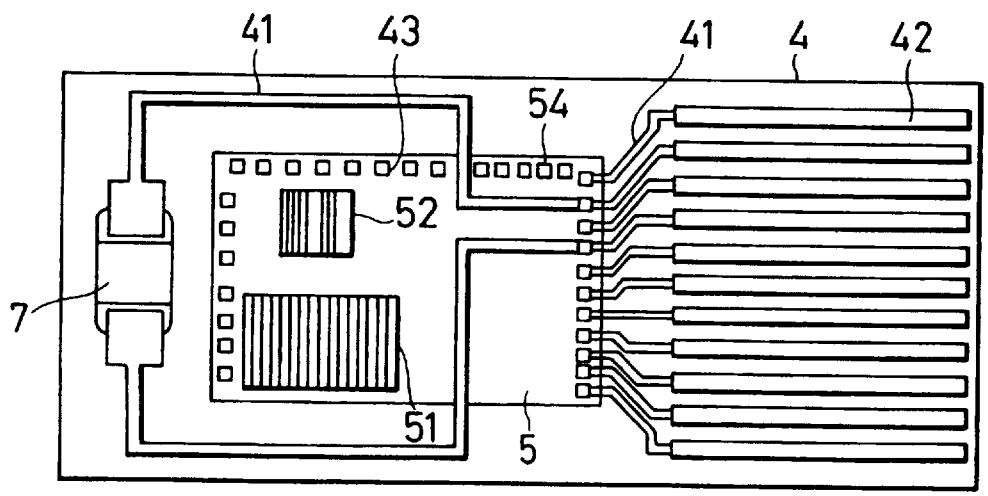
FIG. 2C is a rear view of FIG. 2A.

The second member 3 comprises a glass substrate 4 and a light receiving IC chip 5. The glass substrate 4 is moved relatively to the main scale 1. The glass substrate 4 has a front surface opposite to the main scale 1 with a gap and a reverse surface. The light receiving IC chip 5 is disposed on the reverse surface of the glass substrate 4. The optical grating for the index may be formed at least one of the glass substrate 4 and the light receiving chip 5. However, in this example, as will be described later, the optical grating is formed on the light receiving surface of the light receiving IC chip 5. FIGS. 2A to 2C show the integral structure of the light receiving IC chip 5 and the glass substrate 4. FIG. 2A is a plan view showing the integral structure viewed from the light receiving IC chip 5. FIG. 2B is a side view of FIG. 2A. FIG. 2C is a plan view showing the integral structure viewed from the front surface of the glass substrate 4.

Figure 3:
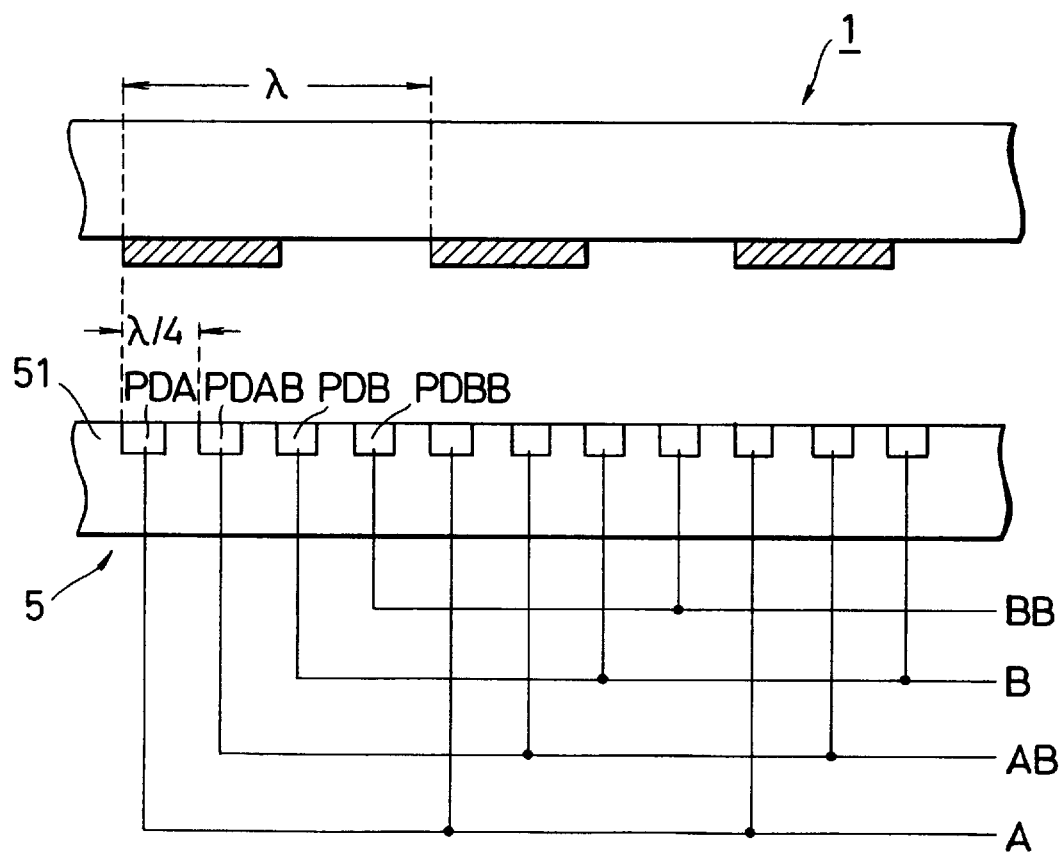
FIG. 3 is an enlarged perspective view showing the relation between a light receiving device array and a main scale according to the embodiment.

As shown in FIG. 3, the light receiving IC chip 5 has a light receiving device array 51 that is common with the optical grating for the index. The light receiving device array 51 has sets of four photo diodes PDA, PDAB, PDB, and PDBB with respective phases that differ from each other by $\lambda/4$ against the optical grating pitch $\lambda$ of the main scale.

With the above-described structure, the collimated light of the light radiating device 2 is radiated to the main scale 1. The transmitted light of the main scale 1 is modulated by the light receiving device array 51. The light receiving device array 51 outputs four sine wave signals with different phases.

In this embodiment, in addition to the optical grating 12 for detecting the displacement, a zero point detection pattern 13 is formed on the glass substrate 11 of the main scale 1. Likewise, in addition to the light receiving device array 51 for detecting the displacement, a zero point detection light receiving device array 52 corresponding to the zero point detection pattern 13 is integrally disposed on the light receiving IC chip 5. In this embodiment, an amplifying circuit 53 that amplifies output signals of the light receiving device arrays 51 and 52 is also integrally disposed on the light receiving IC chip 5.

Figure 4:
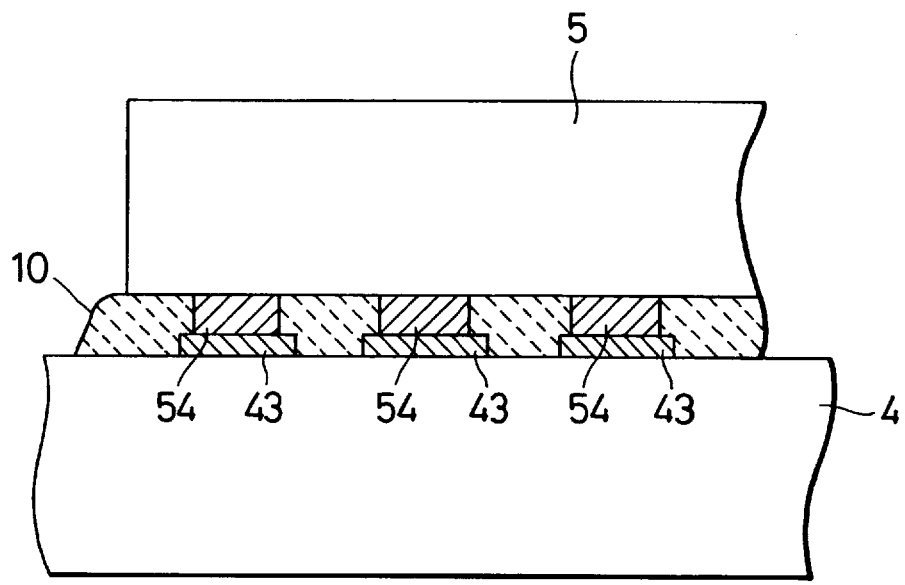
FIG. 4 is an enlarged side view showing a portion of which the light receiving IC chip is disposed according to the embodiment.

In this embodiment, the light receiving IC chip 5 is disposed on the glass substrate 4 by the face-down bonding method. In other words, as shown in FIG. 2, patterns of thin film electrodes 43, thin film lines 41, and external terminals 42 that connect the terminals of the light receiving IC chip 5 to the outside have been formed on the glass substrate 4. In addition, solder bumps 54 composed of a metal with a low melting point are formed on an external terminal pad of the light receiving IC chip 5 corresponding to the thin film electrodes 43 of the glass substrate 4. As shown with a enlarged view of FIG. 4, the solder bumps 54 of the light receiving IC chip 5 are heat-fitted to the thin film electrodes 43 of the glass substrate 5. Thus, the glass substrate 4 and the light receiving IC chip 5 are integrally formed. As shown in FIG. 4, a transparent resin 10 is filled in the gap between the glass substrate 4 and the light receiving IC chip 5. Thus, the light receiving surface of the light receiving chip 5 is sealed.

As an example of the transparent resin 10, one of a natural resin and a synthetic resin (a thermoplastic resin or a thermosetting resin) can be used. However, since the light receiving IC generates heat to some extent, when a thermosetting resin is used, it should have low coefficient of heat expansion. When a resin with low coefficient of heat expansion is used, the distortion due to the difference of expansions between the glass substrate 4 and the light receiving IC chip 5 can be prevented. The transparent resin 10 preferably has high glass transition temperature and low water absorbing power. A resin with low water absorbing power prevents alkali ions and moisture in air from taking place, thereby preventing the light receiving IC from deteriorating.

When the above-described face-down bonding method is used, the gap between the light receiving IC chip 5 and the glass substrate 4 that is in common with the index scale can be precisely adjusted in small size at the heat-fitting step. In addition, when an alignment mark is formed on the glass substrate 4 beforehand, the scale and index can be precisely aligned.

In this embodiment, a chip capacitor 7 for stabilizing a DC power supply is disposed on the glass substrate 4 along with the light receiving chip 5. In addition, a flexible printed board 6 is connected to the external terminal portion 42 of the thin film lines 41.

As shown in FIG. 5, the light radiating device 3 comprises power supply lead frames 21a and 21b, an LED 23, a transparent resin 22, and an non-spherical lens member 24.

The LED 23 is disposed on one side of the lead frames 21a and 21b. The one side of the lead frames 21a and 21b and the LED 23 are molded with the transparent resin 22. The aspherical lens member 24 is composed of a transparent resin adhered to the transparent resin 22. As shown in FIG. 5, the lens member 24 has a shape of which a hemispherical member is halved. The lens member 24 is obtained by a minute-casting process. A reflection film 25 composed of aluminum or the like is coated on the outer surface of the lens member 24. Thus, the lens member 24 functions as a concave mirror. The lens member 24 in the shape of a halved hemispherical substance radiates collimated reflected light with higher collimation property than the hemispherical substance.

Figure 6:
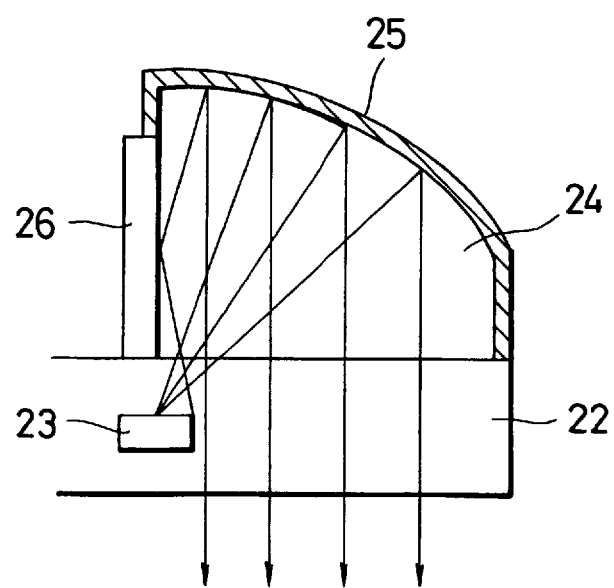
FIG. 6 is a sectional view showing the structure of the light radiating means.

As shown with an enlarged sectional view of FIG. 6, the LED 23 is disposed on an extended line of a vertical cut surface of the hemispherical substance. Only light on one side of the center line of the LED 23 becomes collimated light. A reflecting plate 26 is adhered to the vertical cut surface. Thus, light radiated from the peripheral portion of the LED 23 is guided by the vertical cut surface to the concave mirror, whereby the light is effectively used as almost collimated light.

Figure 7:
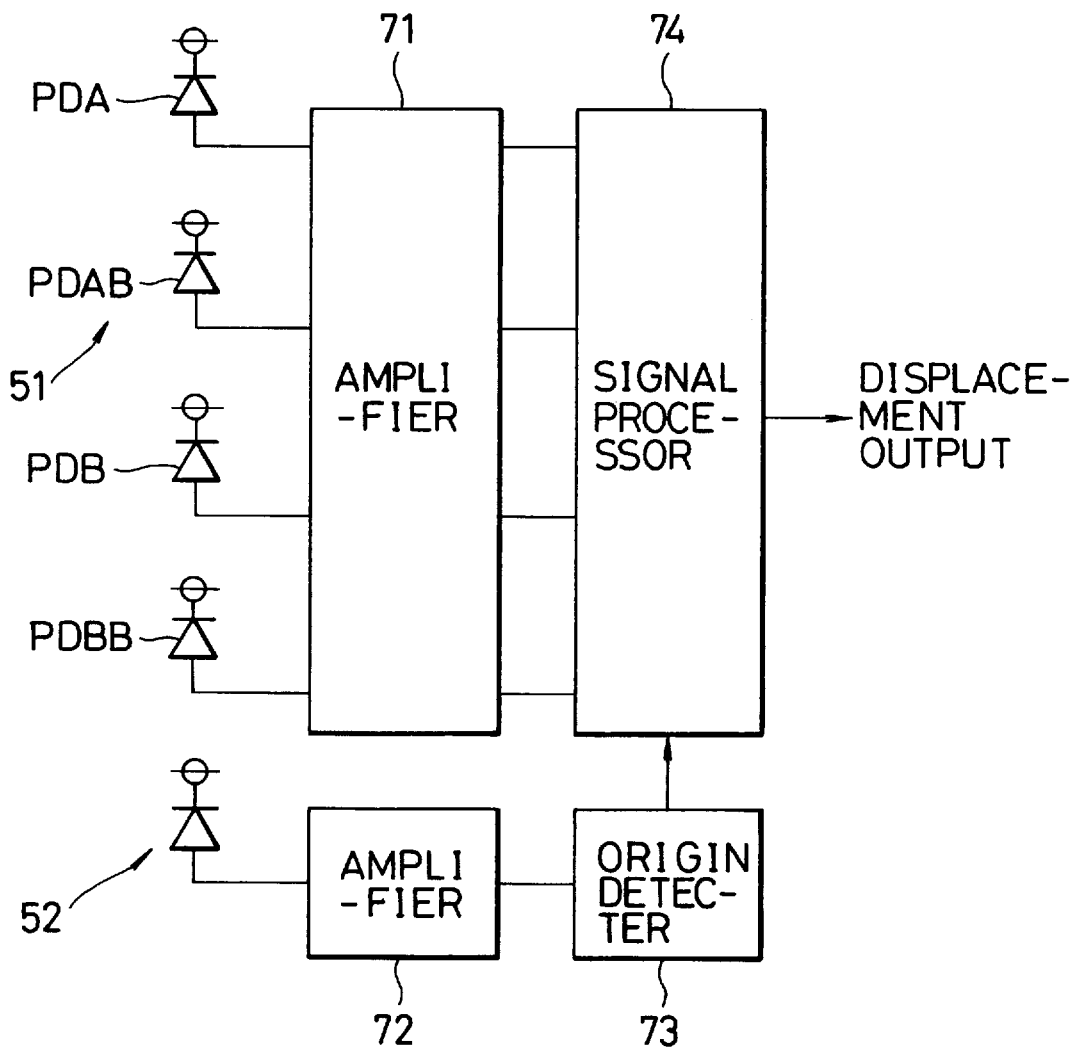
FIG. 7 is a circuit diagram showing the light receiving device array and circuits downstream thereof according to the embodiment.

FIG. 7 is a circuit diagram showing the structure of the light receiving portion and circuits downstream thereof according to the embodiment. Output signals of the displacement detection light receiving array 51 and the zero point detection light receiving array 52 are supplied to amplifying circuits 71 and 72, respectively. The amplifying circuits 71 and 72 amplify the output signals of the light receiving device arrays 51 and 52, respectively. The output signal of the zero point detection light receiving device array 52 is supplied to a zero point detecting circuit 73. The zero point detecting circuit 73 generates a zero point detection signal. A signal processing circuit 74 detects the displacement of the main scale 1 as the first member and the second member 3 corresponding to the output signals with four phases of the displacement detection light receiving device array 51 and the zero point detection signal. As described above, in this embodiment, at least the light receiving device arrays 51 and 52 and the amplifying circuits 71 and 72 are disposed on the light receiving IC chip 5. In addition, the zero point detecting circuit 73 and the signal processing circuit 74 may be disposed on the light receiving IC chip 5.

In this embodiment, the light receiving IC chip is disposed on the glass substrate by the face-down bonding method. They function as an index scale. Thus, the gap between the light receiving surface and the main scale is very small. In addition, they can be precisely aligned. Consequently, the apparatus provides excellent characteristics with less crosstalk. In addition, since a transparent resin is filled in the gap between the light receiving IC chip and the glass substrate, and the light receiving surface is sealed, the front surface of the light receiving IC chip is effectively protected. Thus, the reliability of the apparatus is sufficiently high. With a combination of a module of a light receiving means and a module of a light radiating means, a small and high-performance optical encoder that can be mounted on an 8 mm φ linear gauge can be obtained.

In addition, according to the embodiment, the zero point detection pattern is formed on the main scale. In addition to the displacement detection light receiving device array, the zero point detection light receiving device array is disposed on the light receiving IC chip. Thus, excellent function is accomplished.

Figure 8:
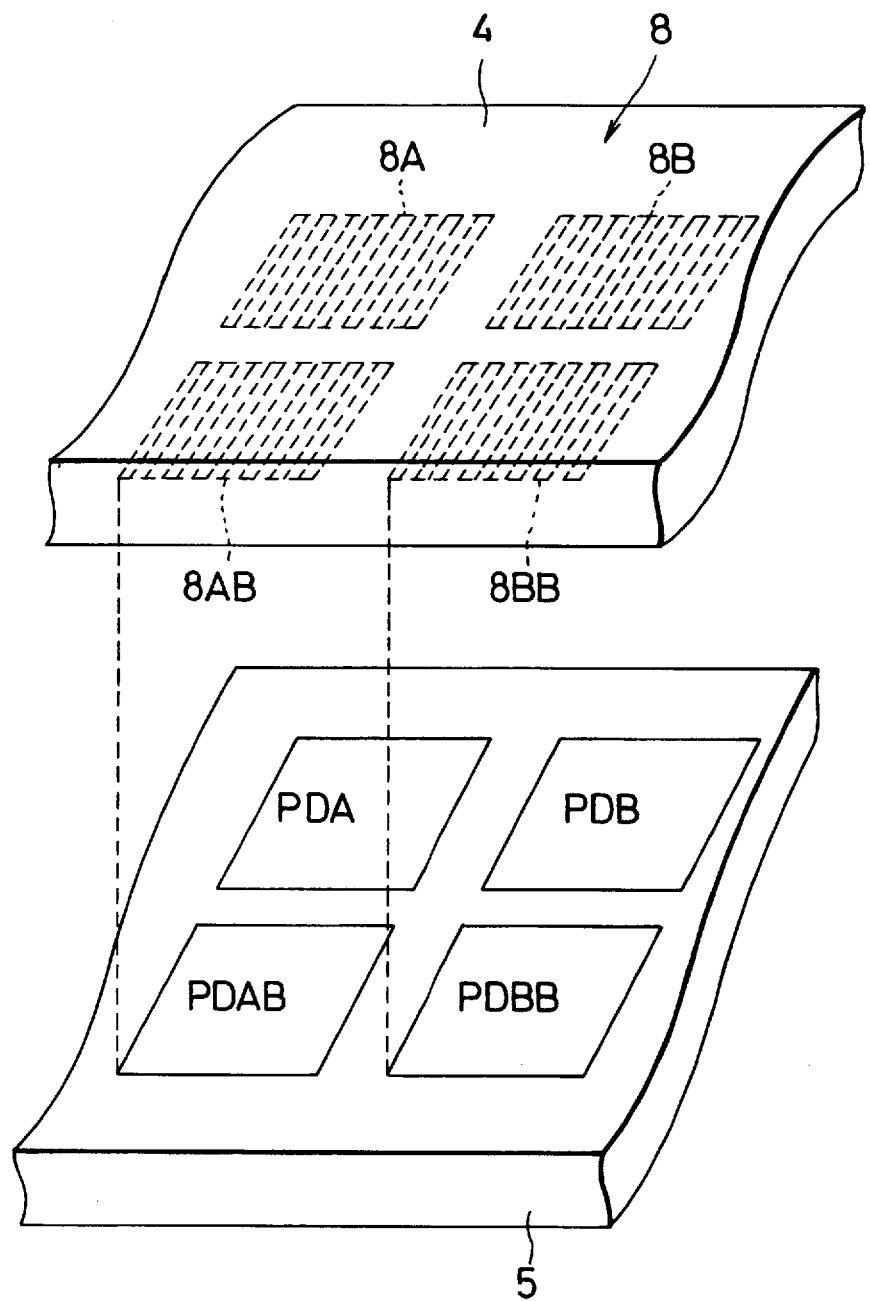
FIG. 8 is a schematic diagram showing the relation between an index and a light receiving device according to another embodiment of the present invention.

It should be noted that the present invention is not limited to the above-described embodiment. For example, the present invention is applied to a structure of which an index scale is separated from light receiving devices instead of the structure of which the light receiving device array is in common with the index scale. In this case, a pattern of an optical grating is formed as an index scale on the glass substrate 4 corresponding to an optical grating on the main scale. The relation between the index grating 8 and the light receiving devices is exemplified in FIG. 8. Index gratings 8A and 8B with a phase difference of 180° are formed as patterns in the longitudinal direction (the direction of the displacement). Index gratings 8AB and 8BB with a phase difference of 90° to the phases of the index gratings 8A and 8B are formed as patterns in the direction perpendicular to the direction of the displacement. In other words, four index gratings with phases 0°, 90°, 180°, and 270° are disposed in the range of the width of the optical grating 12 of the scale 1 on the glass substrate 4 so that a matrix of 2×2 is formed. The light receiving devices of the light receiving IC chip 5 are four photo diodes PDA, PDB, PDAB, and PDBB that are disposed opposite to the four index gratings with different phases.

In this case, as with the above-described embodiment, the light receiving IC chip 5 is disposed on the glass substrate 4 with solder bumps by the face-down bonding method. A resin is filled in the gap between the glass substrate 4 and the light receiving IC chip 5.

Figure 9:
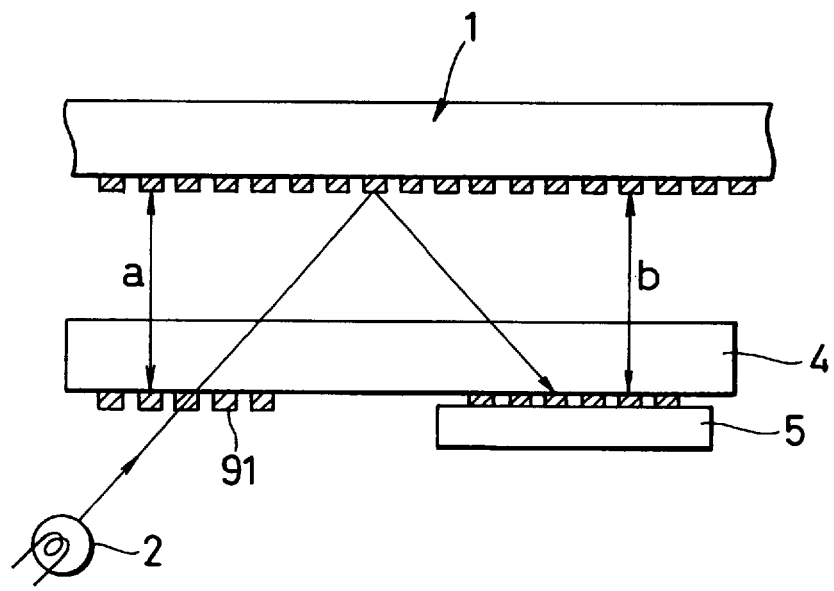
FIG. 9 is a schematic diagram showing the structure of a reflection type encoder according to another embodiment of the present invention.

Although the above-described embodiment is a transmission type encoder, the present invention can be applied to a reflection type encoder of which a light radiating device 2 is disposed on the same side as a second member 3 to a main scale 1. FIG. 9 shows the structure of such a reflection type encoder. On a glass substrate 4 to which a light receiving IC chip 5 is disposed, a first index grating 91 is formed on the light source side. In addition, as with the above-described embodiment, a light receiving IC chip 5 that is in common with a second index grating on the light receiving side is disposed on the glass substrate 4. In this embodiment, the distance "a" from the index grating 91 on the light source side to the main scale surface is almost equal to the distance "b" from the main scale surface to the light receiving surface. Thus, preferable characteristics can be obtained. In this case, the light radiating device 2 radiates diffused light to the main scale 1.

Figure 10:
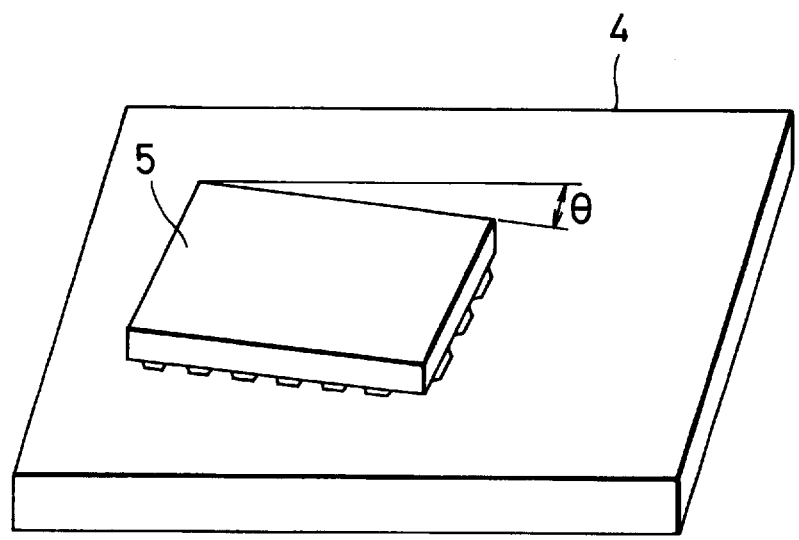
FIG. 10 is a schematic diagram showing the structure of a moire type encoder according to another embodiment of the present invention.

Moreover, the present invention can be applied to an apparatus that has an optical encoder corresponding to a moire system of which the displacement of moire fringes generated by two optical gratings that have a predetermined angle of each other is detected corresponding to the movement of a scale. In this case, as shown in FIG. 10, a light receiving IC chip 5 is disposed on the glass substrate 4 with a predetermined angle θ to the direction of the mutual movement of the first and second members. The angle θ can be easily and securely set up with an alignment mark.

In addition, the present invention can be applied to a rotary encoder along with the above-described linear encoder. As the light receiving IC chip, a monolithic IC, an IC with thin film light receiving devices composed of an amorphous silicon film, and other ICs can be used.

As described above, according to the present invention, since the light receiving IC chip of the light receiving portion is disposed on the glass substrate having thin film electrodes through solder bumps by the face-down bonding method, the gap between the light receiving IC chip and the glass substrate can be precisely adjusted in small size. Thus, the gap between the light receiving surface of the light receiving IC and the scale can be decreased and precisely set up. Consequently, an optical encoder with high performance and high reliability can be obtained. In particular, according to the preferred mode of the present invention, in the case that a plurality of light receiving devices of the light receiving IC chip compose a light receiving device array that is in common with an index grating, when the index and the light receiving portion are integrally formed, an optical encoder that is small and that has high performance can be obtained.

The entire disclosure of Japanese Patent Application No. 8-285541 filed on Oct. 28, 1996 including specification, claims, drawings and summary are incorporated herein by reference in its entirety.

What is claimed is:

1. An optical displacement detecting apparatus, comprising:
    a first member having a first optical grating;
    a light radiating device for radiating light to the first optical grating of said first member; and
    a second member having a second optical grating, disposed opposite to said first member through a gap so that said first member and said second member can be relatively moved, for receiving the light radiated from said light radiating device through the first optical grating and the second optical grating so as to detect the relative displacement between said first member and said second member,
    wherein said second member has a transparent substrate which has a front surface opposite to the first member with the gap and a reverse surface on which thin film electrodes are disposed, and a light receiving chip which has a light detecting device for receiving the light and solder bumps formed on the light receiving chip corresponding to the thin film electrodes on the reverse surface of the transparent substrate, said light receiving chip being disposed on the reverse surface of the transparent substrate through the solder bumps and the thin film electrodes by face-down bonding method, and
    wherein the second optical grating is disposed on at least one of the transparent substrate and the light receiving chip.

2. The optical displacement detecting apparatus according to claim 1, wherein the transparent substrate is a glass substrate.

3. The optical displacement detecting apparatus according to claim 1, further comprising:
    a transparent resin filled in a gap between the transparent substrate and the light receiving chip.

4. The optical displacement detecting apparatus according to claim 1,
    wherein said light radiating device is a light detecting array that is in common with the second optical grating.

5. The optical displacement detecting apparatus according to claim 1, further comprising:
    a zero point detection pattern formed on said first member; and
    a second light detecting device for detecting the zero point detection pattern formed on the light receiving chip.

6. The optical displacement detecting apparatus according to claim 1, further comprising:
    an amplifier, disposed on the light receiving chip, for amplifying output signal of the light detecting device.

7. The optical displacement detecting apparatus according to claim 1,
    wherein said second member is disposed on the opposite side of said light radiating device to said first member and receives transmitted light of the first optical grating.

8. The optical displacement detecting apparatus according to claim 1,
    wherein said second member is disposed on the same side as said light radiating device to said first member and receives reflected light of said first member.

9. The optical displacement detecting apparatus according to claim 1,
    wherein the light receiving chip is obliquely disposed on the transparent substrate to the direction of the displacement between said first member and said second member.

* * * * *